United States Patent [19]

Neefe

[11] 4,422,984

[45] Dec. 27, 1983

[54] CENTRIFUGAL CASTING OF CONTACT LENSES

[76] Inventor: Charles W. Neefe, 811 Scurry St., Box 429, Big Spring, Tex. 79720

[21] Appl. No.: 417,555

[22] Filed: Sep. 13, 1982

[51] Int. Cl.³ ............................................. B29D 11/00
[52] U.S. Cl. ..................................... 264/2.1; 264/311; 425/808
[58] Field of Search ................... 264/1.8, 2.1, 2.5, 311; 425/808

[56] References Cited

U.S. PATENT DOCUMENTS

| | | | |
|---|---|---|---|
| 2,325,019 | 7/1943 | Rubisson | 264/311 |
| 2,429,692 | 10/1947 | Joyce | 264/2.1 |
| 3,010,153 | 11/1961 | Bittner | 425/808 |
| 3,274,301 | 9/1966 | Kulp, Jr. | 264/2.1 |
| 3,660,545 | 5/1972 | Wichterle | 264/1.4 |
| 4,002,418 | 1/1977 | Wallace | 425/425 |
| 4,217,124 | 8/1980 | Wyden | 264/311 |

Primary Examiner—James B. Lowe

[57] ABSTRACT

A method of casting contact lenses by forcing the liquid monomer into the optical molds under very high pressure, the pressure being provided by centrifugal force by revolving the lens mold around a center of rotation perpendicular to the optical axis of the lens and polymerizing the liquid monomer under pressure to form the lens.

10 Claims, 2 Drawing Figures

CENTRIFUGAL CASTING OF CONTACT LENSES

PRIOR ART

The art of spin casting contact lenses has been in use for nineteen years. The principal value of spin casting is its low cost and high production. The disadvantages are the lenses are not spherical and the aspheric surface is of a shape that increases spherical aberration. The exact shape is most difficult to describe due to its being formed by several forces including centrifugal force, surface tension, viscosity of the liquid and radius of the concave mold. The Panofocal concept described in U.S. Pat. No. 3,641,717 is widely used to reduce the effects of spherical aberration. The most frequent use of Panofocal lenses is to provide increased acuity for patients having astigmatism. The Panofocal aspheric surface is on the convex or the plus lens surface and of longer radius toward the lens edge and reduced spherical aberration, improving the visual acuity of the wearer up to two lines Snellen. The aspheric surface formed on the concave or minus surface of a spin cast lens is also longer toward the edge, however, when the soft lens is placed on the eye, it results in a shorter radius toward the edge on the convex plus surface and greatly increases the spherical aberration effect. This has three disadvantages: (1) The usable optical zone in the center of the lens is reduced requiring the lens to center well. (2) The reduction in visual acuity due to increased spherical aberration effect. (3) Visual acuity will fluxuate with lens movement.

A gravity method using no seals and a movable floating mold is disclosed in U.S. Pat. No. 3,380,718 issued Apr. 30, 1968. Only the pressure of gravity could be used and the mold must be movable to compensate for monomer shrinkage upon polymerization and two types of catalyst must be used.

SUBJECT OF THE INVENTION

Figure 1:
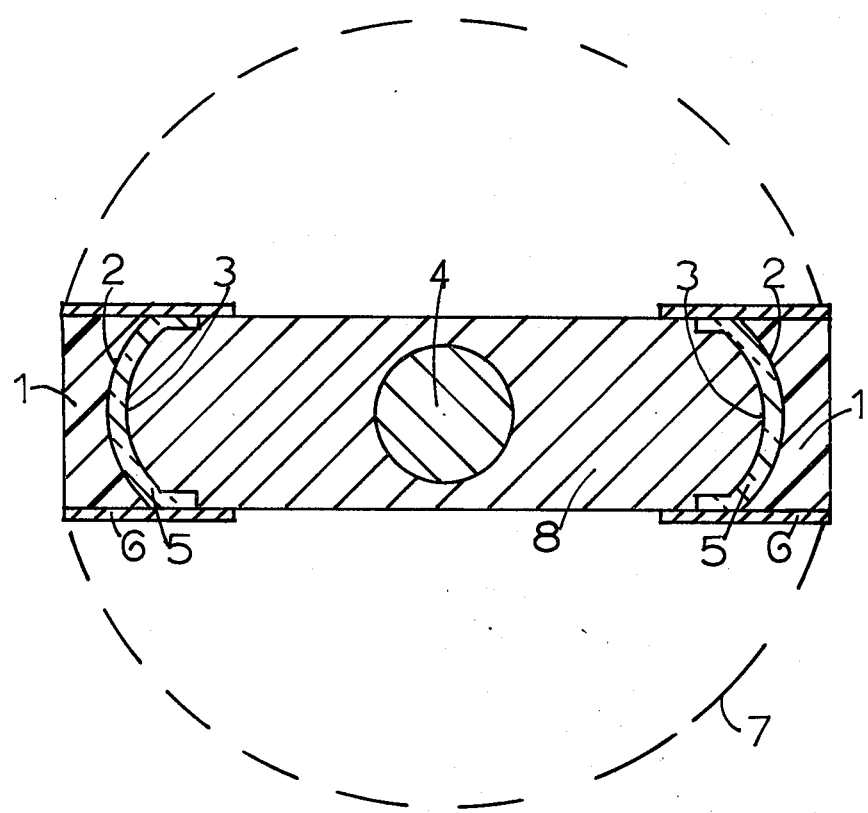
FIG. 1 shows the centrifugal casting equipment from the top in section.

A method has been developed whereby the advantages of high pressure casting may be employed to produce lenses with spherical surfaces and without the need for movable molds or sealed molding cavities.

The current lens molds are fabricated from steel or glass, each mold is individually ground and polished to the required specifications. To achieve accurate reproduction of the molds is most difficult and expensive.

The molds required to practice the present invention may be made by injection molding or compression molding. In this process a negative master mold is made of steel or other durable substances and a resin material such as nylon, polyester or polyethylene is molded against the negative mold to produce the resin molds required to practice the invention. Dissimilar molds can be an advantage as the lens material will adhere to one mold surface and release from the other making the rapid removal of the lens from the mold possible. Molded resinous molds are inexpensive and disposable being used only once and discarded. This eliminates the need for cleaning and inspection before reuse.

High pressure lens casting has been attempted but difficulties with the flexible seals required between the two lens molds has presented an insurmountable problem when extreme high pressures are encountered. Thickness control, or the spacing between the molds, is most difficult to achieve with flexible seals and movable mold surfaces. The thickness must be controlled to plus or minus 0.005 millimeters for top quality thin type lenses. This presents a major problem for high pressure casting techniques. Pressures of 100 to 1000 atmospheres are employed in high pressure lens casting. The lens quality and reject ratio can be very desirable, however, equipment problems have prevented commercialization of the technology.

DESCRIPTION OF THE PREFERRED EMBODIMENT

The lenses are cast of a selected lens monomer such as methylmethacrylate, Hydroxyethylmethacrylate or silicone. The monomer is copolymerized with additives such as cross-linkers to improve the quality of the finished lenses. A Catalyst is added to control the time required for polymerization. Typical examples of these mixtures are:

| (1) | Ethylene glycol monomethacrylate | 64.8% |
|---|---|---|
| | Diethylene glycol monomethacrylate | 7.056% |
| | Ethylene glycol dimethacrylate | 0.144% |
| | Water | 20.9% |
| | Ammonium persulfate | 1.1% |
| | 2-dimethylaminoethyl acetate | 6.0% |
| (2) | Ethylene glycol monomethacrylate | 54.7% |
| | Diethylene glycol monomethacrylate | 17.2% |
| | Diethylene glycol dimethacrylate | 0.6% |
| | Ammonium persulfate | 1.1% |
| | Dimethylaminoethyl acetate | 5.8% |
| | Water | 20.6% |
| (3) | Methylmethacrylate | 96.75% |
| | Ethylenedimethacrylate | 3.00% |
| | Benzoyl Peroxide | .25% |

The appliction of heat to the molds will reduce further the time required for polymerization. Photo sensitive catalysts may be used with transparent outer molds and ultraviolet light may reduce the time required for polymerization without the application of heat.

Figure 2:
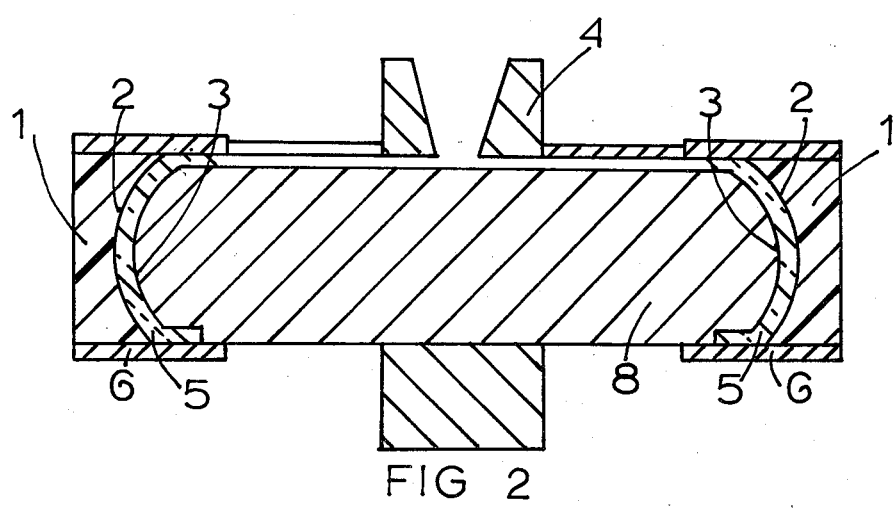
FIG. 2 shows the centrifugal casting equipment from the side in section.

Outer concave molds 1 FIGS. 1 and 2 are made from nylon resin. A centrifuge is constructed having a convex mold surface 3 FIGS. 1 and 2. The restraining bar 8 FIGS. 1 and 2 is rotated on center shaft 4 FIGS. 1 and 2. The retaining cylinders 6 FIGS. 1 and 2 hold the outer concave molds 1 in alignment. The optical surfaces 2 and 3 FIGS. 1 and 2 are held in alignment and at the required distance from each other. This provides for positive prism and thickness control. The molds are revolved at slow speeds to provide 2 to 10 forces of gravity at the optical surfaces 2 FIGS. 1 and 2. The prepared and catalized monomer is added through port 9 FIG. 2 in the center of the rotating shaft 4 FIG. 2. The monomers enter passage way 10 FIG. 2 and are moved into the lens area 5 FIGS. 1 and 2. As polymerization proceeds the viscosity of the liquid monomer increases and the speed or rotation of the restraining bar 8 FIGS. 1 and 2 is increased to provide greater centrifugal force to drive the monomers into the lens mold area 5 FIGS. 1 and 2. The quantity of monomer added is not critical beyond the volume required to fill mold cavity 4 FIGS. 1 and 2 and an additional quantity to replace the monomer volume lost due to shrinkage during polymerization. The monomer may be in a syrup stage partially polymerized when added to the centrifuge to reduce the time requirement. The centrifuge may also be heated to further reduce the time required for polymerization. The speed of revolution and the resulting acceleration force placed on the monomer is increased as the monomer material reaches the syrup stage and begins to enter the gel stage. This prevents the high acceleration force from separating the components of the monomer. The acceleration force placed on the monomer is not along its circular path, but perpendicular or at right angles to it, outward from the center of rotation along the optical axis of the lens. The acceleration force equals the square of the speed around the orbit divided by the radius of the orbit ($S^2/R$). A rotational speed of 10,000 revelations per minute (the design limit of the rotor) around a five inch radius 7 FIG. 1 will yield an acceleration force of 38,076 inches per second or 1,190 times the acceleration of gravity. A well designed centrifuge is capable of generating acceleration forces in excess of 10,000G. The centrifuge rotor is contained in a vacuum housing to reduce the energy required to move the rotor. The vacuum also degasses the monomer and prevents inhibitance of polymerization due to the presence of atmospheric gases. The vacuum housing also provides a protective shield should the rotor disintergrate. At the high pressure provided by the centrifuge, optics of excellent quality and true mold surface replication are possible in a short time frame. The centrifuge may be made of a metal disc having multiple mold pairs located around the periphery enabling many lenses to be produced at each polymerization cycle. The resin mold must be well supported to prevent distortion of its shape under the high G forces. Movement of the molds is not required as the lens monomer remains in contact with the mold surfaces during polymerization due to packing in effect of the acceleration applied during polymerization the monomer moves outward and into the lens area maintaining contact between the lens material 5 FIGS. 1 and 2 and the mold surfaces 2 and 3 FIGS. 1 and 2. The process is most desirable for soft lenses due to the limited number of concave radii required. The concave mold surfaces 3 FIGS. 1 and 2 are made from polished stainless steel and remain in the centrifuge while the disposable concave resin molds 1 FIGS. 1 and 2 are changed to provide the required refractive powers. The lens is removed from the machine attached to the surface of the resin mold 1 FIGS. 1 and 2. The lens is later removed from the surface of the resin mold 1 FIGS. 1 and 2 for final inspection.

The position of the mold may be reversed placing the concave mold on the inner surface and the convex mold on the outer surface. This configuration has been examined to eliminate rejects due to the presence of foreign material particles in the molding chamber being moved outward beyond the usable lens area. In practice this procedure is not deemed necessary if the monomer is filtered and the rotor is run up with the outer concave mold removed to exclude all foreign particulate matter from the convex mold surface with centrifugal force. The concave molds are not reused, therefore, no cleaning is required. Lenses of all refractive types may be made with equal ease. The types include spherical lenses, both positive and negative refractive power, convex torics, concave torics, bitorics being a toroidal shape both concave and convex lenticular designs, aspherics both concave and convex and bi-aspherics having both concave and convex aspheric surfaces and bifocal lenses. The repeatability surpasses any presently known method of lens production. The equipment cost is considerable as the rotational power is supplied by air driven turbines and rotation support is on air bearings, but production economizes and lack of rejects make the long term use attractive. Direct current electric motors are also capable of the speeds required and quality roller or ball bearings are capable of supporting the rotor.

Various modifications can be made without departing from the spirit of this invention or the scope of the appended claims. The constants set forth in this disclosure are given as examples are are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of centrifugal casting optical lenses by the steps of, placing a selected liquid lens monomer between an inner mold and an outer mold, revolving a plurality of these lens molds around a common center with the lens optical axis passing through the common center of rotation, allowing the liquid lens monomer to begin polymerization and the liquid monomer viscosity to increase to form a syrup, adding rotational power to increase the speed of rotation of the lens molds around their common center and allowing the polymerization to proceed and the volume of lens monomer to decrease and the speed of rotation of the lens molds to increase until a solid resinous lens fills the space between the lens molds allowing the rotation to cease and removing the finished lens from the lens molds.

2. A method as in claim 1 wherein the inner mold is convex and the outer mold is concave.

3. A method as in claim 1 wherein the outer mold is convex.

4. A method as in claim 1 wherein the inner mold is metal and the outer mold is of a resinous material.

5. A method as in claim 1 wherein the inner and outer mold is of a resinous material.

6. A method as in claim 1 wherein the liquid monomer is added through an opening provided in the center of the rotational shift.

7. A method as in claim 1 wherein heat is applied to the lens mold to reduce the time required to achieve polymerization.

8. A method as in claim 1 wherein one or more of the molds surface is toric.

9. A method as in claim 1 wherein one or more of the molds surface is aspheric.

10. A method as in claim 1 wherein the lens produced is a bifocal lens.

* * * * *